United States Patent [19]

Kropac et al.

[11] 3,861,910

[45] Jan. 21, 1975

[54] MANIFOLD IMAGING PROCESS

[75] Inventors: Joseph Kropac, Williamson; Paul Swanton, Webster, both of N.Y.

[73] Assignee: Xerox Corporation, Rochester, N.Y.

[22] Filed: Jan. 13, 1969

[21] Appl. No.: 790,730

[52] U.S. Cl. .......................... 96/1 M, 96/1.2, 96/1.5
[51] Int. Cl. ........................ G03g 17/00, G03g 13/00
[58] Field of Search ..................... 96/1, 1.5, 1 M, 1.2

[56] References Cited

UNITED STATES PATENTS

| | | | |
|---|---|---|---|
| 3,438,772 | 4/1969 | Gundlach | 96/1 |
| 3,510,419 | 5/1970 | Carreira et al. | 95/1.5 X |
| 3,512,968 | 5/1970 | Tulagin | 96/1 X |

OTHER PUBLICATIONS

P. M. Cassiers, "Memory Effects in Electrophotography," Journal of Photographic Science, Vol. 10, 1962, pp. 57–64.

*Primary Examiner*—David Klein
*Assistant Examiner*—John R. Miller

[57] ABSTRACT

A method for producing a latent image which can be later developed which comprises exposing an imaging layer comprising an electrically photosensitive material to electromagnetic radiation to which the layer is sensitive while the layer is subjected to an electrical field. The electrical field is then removed leaving a developable latent image in the imaging layer. The latent image may be developed by means such as a manifold layer transfer imaging process.

10 Claims, 3 Drawing Figures

INVENTOR.
JOSEPH KROPAC
BY PAUL SWANTON

ATTORNEY

MANIFOLD IMAGING PROCESS

BACKGROUND OF THE INVENTION

This invention relates in general to the production of latent images and more specifically to the production of a latent image by means of exposing an electrically photosensitive material to electromagnetic radiation.

There has recently been developed a manifold imaging technique based upon the transfer of an imaging layer comprising a cohesively weak electrically photosensitive material sandwiched between a pair of sheets. Under the influence of electromagnetic radiation to which the imaging layer is sensitive and an electric field the imaging layer fractures in imagewise configuration when the sandwich is separated under an electrical field. Previously, an image was produced by the manifold process only when the imaging layer was exposed to electromagnetic radiation under an electrical field followed by separation of the manifold sandwich while maintaining the field. In such a process there was a continuous electrical field applied to the manifold sandwich from the time the imaging layer was exposed to electromagnetic radiation to the time the imaging layer was fractured by means of separating the manifold sandwich. Previous attempts to separate the exposure step from the charging or placing of the electrical field across the manifold sandwich involved the use of electrically photosensitive material possessing a fatigue characteristic. That is, previously, in order to produce a latent image in a manifold imaging layer comprising electrically photosensitive materials it was necessary to use only such materials which possessed the characteristic commonly termed as light fatigue. Light fatigue is a property of electrically photosensitive materials whereby electrical conductance continues in the dark after exposure to light. The amount of time electrical conductance continues varies greatly depending upon the materials used, the amount of exposure and the strength of electrical field. Thus, previously latent images could be maintained for only a limited time. In addition, latent image previously must have been kept in darkness after initial image exposure.

In the absence of electrically photosensitive materials possessing fatigue characteristics the prior art manifold imaging process most commonly required the use of a complex apparatus. In the most common embodiment of this imaging technique, a layer of cohesively weak electrically photosensitive imaging material is coated onto a substrate. This coated substrate is called a donor. In one form the imaging layer comprises a photosensitive material such as metal-free phthalocyanine dispersed in a binder. When needed in preparation for the imaging operation, the imaging layer is activated as by contacting it with a swelling agent, solvent, or partial solvent for the imaging layer or by heating. This step may be eliminated of course if the layer retains sufficient residual solvent after having been coated on the substrate from a solution or paste or is sufficiently cohesively weak to fracture in response to the application of light and electrical field. After activation a receiving sheet is laid over the surface of the imaging layer. An electrical field is then applied across this manifold sandwich while it is exposed to a pattern of light and shadow representative of the image to be reproduced. Upon separation of the donor substrate or sheet and receiving sheet the imaging layer fractures along the line defined by the pattern of light and shadow to which the imaging layer has been exposed. Part of the imaging layer is transferred to one of the sheets while the remainder is retained on the other sheet so that a positive image, that is a duplicate of the original, is produced on one sheet while a negative image is produced on the other sheet.

The prior art process as described above produces high quality, high contrast images. However, several disadvantages are apparent in the prior art process. For example, it was necessary to have an electric field applied across the sandwich during the exposure of the imaging layer to electromagnetic radiation and continuing until image development was complete. It was, therefore, conventional to use an apparatus which combined the process steps of imaging, electrical charging, and sandwich separation. The imaging step was, therefore, performed within a complex apparatus and such complex apparatus usually contained, in one unit, all of the equipment necessary to perform all of the steps of the manifold imaging process. There is desired a manifold imaging process in which a stable latent image is formed which image can be developed at a time and location remote from the image exposure step.

SUMMARY OF THE INVENTION

It is, therefore, an object of this invention to provide a manifold imaging process which overcomes the above noted disadvantages.

It is another object of this invention to provide a sequential manifold imaging process capable of providing relatively high quality images.

Another object of this invention is to provide a manifold imaging process wherein the image exposure step is remote in time and location from the image development step.

It is another object of this invention to provide a manifold imaging process wherein a stable latent image is produced.

It is another object of this invention to provide a manifold imaging process wherein the exposure step is accomplished prior to forming the manifold sandwich.

Another object of this invention is to provide a manifold imaging process wherein a latent image is produced without the aid of electrically photosensitive materials possessing fatigue characteristics.

The foregoing objects and others are accomplished in accordance with this invention by a process which comprises exposing an imaging layer comprising an electrically photosensitive material to electromagnetic radiation to which the layer is sensitive while the imaging layer is subjected to an electrical field. After the latent image has been produced on the imaging layer the electrical field is removed. Once the electrical field has been removed, the latent image is surprisingly stable even when exposed to general illumination of visible light. The latent image may be developed at a point in time subsequent to the exposure and removal of the electrical field by placing the imaging layer between two sheets, conventionally referred to as donor and receiver sheets, subjecting the imaging layer to a second electrical field and separating the two sheets while under the electrical field. Providing the imaging layer is cohesively weak when the sheets are separated, the layer fractures in imagewise configuration along the lines defined by the electromagnetic radiation to which the imaging layer is sensitive and has been exposed.

Part of the imaging layer is transferred to one of the sheets while the remainder is retained on the other sheet so that a positive image, that is a duplicate of the original is produced on one sheet while a negative image is produced on the other.

In one embodiment of this invention, the electrically photosensitive imaging layer is coated on an electrically insulating substrate or donor sheet. The imaging layer is then subjected to an electrical field for example by imposing a static charge on the donor sheet. After exposing the imaging layer to electromagnetic radiation to which the layer is sensitive the donor is grounded thus reducing the static charge to an insignificant amount. A small amount of charge remains in insulating substrates which is difficult to remove and such small charges have no deleterious effects upon the process of this invention. A latent image is retained on the donor and by exposing the donor on its coated side the latent image is produced without employing any transparent donor sheet receiver or electrode. The latent image can be subsequently developed by placing a receiver in contact with the imaging layer and placing an electric charge across the sandwich and separating the sandwich while under the charge. The imaging layer fractures in imagewise configuration upon separation of the sandwich. It is to be noted that in the above described manifold imaging process, there is no need to employ components which are transparent in any degree to the electromagnetic radiation employed.

Of course, if the imaging layer is placed between the donor sheet and receiver sheet thus forming a manifold sandwich prior to the exposure step, then at least one of the donor or receiver sheets must be at least partially transparent to the electromagnetic radiation employed.

Any suitable electrically photosensitive material or mixtures of such materials may be used in carrying out the invention. The material may be organic or inorganic and can be made up of one or more components in solid solution or dispersed one in the other or the particles can be made up of multiple layers of different materials. Combinations of electrically photosensitive and electrically non-photosensitive materials can be employed. Typical organic materials include: quinacridones such as: 2,9-dimethyl quinacridone, 4,11-dimethyl quinacridone, 2,10-dichloro-6,13-dihydroquinacridone, 2,9-dimethoxy-6,13-dihydroquinacridone, 2,4,9,11-tetrachloro-quinacridone, and solid solutions of quinacridones and other compositions as described in U.S. Pat. No. 3,160,510; carboxamides such as: N-2''-pyridyl-8,13-dioxodinaphtho-(2,1-2', 3') furan -6-carboxamide, N-2''-(1'',3'',5''-triazyl-8,13-dioxodinaphtho-(2,1-2', 3') furan-6-carboxamide, anthra-(2,1) -naphtho-(2,3-d)-furan-9,14-dione-7,-(2'-methyl-phenyl) carboxamide; carboxanilides such as: 8,13-dioxodinaphtho-(2,1-2',3')-furan-6-carbox-p-methoxy-anilide, 8,13-dioxodinaphtho-(2,1-2',3') furan-6-carbox-p-methylanilide, 8,13-dioxodinaphtho-(2,1-2',3') furan-6-carbox-m-chloroanilide, 8,13-dioxodinaphtho-(2,1-2',3') furan-6-carbox-p-cyanoanilide; triazines such as: 2,4-diamino-triazine, 2,4-di (1'-anthraquinonyl-amino)-6-(1''-pyrenyl)-triazine, 2,4-di(1'-anthraquinonyl-amino)-6-(1''-naphthyl)-triazine, 2,4-di (1'-naphthylamino)- 6-(1'-perylenyl)-triazine, 2,4,6-tri (1', 1'', 1'''-pyrenyl) triazine; benzopyrrocolines such as: 2,3-phthaloyl-7,8-benzopyrrocoline, 1-cyano,2,3-phthaloyl-7, 8-benzopyrrocoline, 1-cyano, 2,3-phthaloyl-5-nitro-7, 8-benzopyrrocoline, 1-cyano-2,3-phthaloyl-5-acetamido-7,8-benzopyrrocoline; anthraquinones such as: 1,5-bis-(beta-phenylethyl-amino) anthraquinone, 1,5-bis-(3'-methoxypropylamino) anthraquinone, 1,5-bis (benzylamino) anthraquinone, 1,5-bis (phenylbutylamino) anthraquinone, 1,2,5,6-di (c,c'-diphenyl)-thiazole-anthraquinone, 4-(2'-hydroxyphenylmethoxyamino) anthraquinone; azo compounds such as: 2,4,6-tris (N-ethyl-N-hydroxy-ethyl-p-aminophenylazo) phloroglucinol, 1,3,5,7-tetrahydroxy-2,4,6,8-tetra (N-methyl-N-hydroxyethyl-p-amino phenylazo) naphthalene, 1,3,5-trihydroxy-2,4,6-tri (3'-nitro-N-methyl-N-hydroxymethyl-4'-aminophenylazo) benzene, 3-methyl-1-phenyl-4-(3'pyrenylazo)-2-pyrazoline-5-one, 1-(3'-pyrenylazo)-2-hydroxy-3-naphthanilide, 1-(3'-pyrenylazo)-2-hydroxy-3-methyl-xanthene, 2,4,6-tris (3'-pyrenylazo) phloroglucinol, 2,4,6-tris (1'-phenanthrenylazo) phloroglucinol, 1-(2'-methoxy-5'-nitro-phenylazo)-2-hydroxy-3'-nitro-3-naphthanilide; salts and lakes of compounds derived from 9-phenylaxthene, such as: phosphotongstomolybdic lake of 3,6-bis (ethylamino)-9,2'-carboxyphenyl xanthenonium chloride, barium salt of 3,2'-toluidine amino-6-2''-methyl-4''-sulphophenylamino-9-2'''-carboxyphenyl xanthene; phosphomolybdic lake of 3,6-bis (ethylamino)-2,7-dimethyl-9-2'-carbethoxy-phenylxanthenonium chloride; dioxazines such as: 2,9-dibenzoyl-6,13-dichloro-triphenodiaxazine, 2,9-diacetyl-6,13-dichlorotriphenodioxazine, 3,10-dibenzoylamino-2,9-diisopropoxy-6,13-dichlorotriphenodioxazine; lakes of fluoroescein dyes, such as: lead lake of 2,7 dinitro-4,5-dibromo fluorescein, lead lake of 2,4,5,7-tetrabromo fluorescein, aluminum lake of 2,4,5,7-tetrabromo-10,11,12,13-tetrachloro fluorescein; bisazo compositions such as: N,N'-di-[1-(1'-naphthylazo)-2-hydroxy-8-naphthyl]adiphiamide, N,N'-di-1-(1'naphthylazo)-2-nydroxy-8-naphthyl succindiamide, bis-4, 4'-(2''-hydroxy-8''-N,N'-diterephthalamide-1-naphthylazo) biphenyl, 3,3'-methoxy-4,4'-diphenyl-bis (1''azo-2''-hydroxy-3''-naphthanilide); pyrenes such as: 1,3,6,8-tetracyanopyrene, 1,3-dicyano-6,8-dibromo pyrene, 1,3,6,8-tetraaminopyrene, 1-cyano-6-nitropyrene; phthalocyanines such as: beta-form metal free phthalocyanine, copper phthalocyanine, tetrachloro phthalocyanine, the "X"-form of metal-free phthalocyanine as described in U.S. Pat. No. 3,357,989; metal salts and lakes of azo dyes, such as: calcium lake of 6-bromo-1(1'-sulfo-2-naphthylazo)-2-naphthol, barium salt of 6-cyano-1(1'-sulfo-2-naphthylazo)-2-naphthol, calcium lake of 1-(2'-azonaphthalene-1'-sulfonic acid)-2-naphthol, calcium lake of 1-(4'-ethyl-5'-chloroazobenzene-2'-sulfonic acid)-2-hydroxy-3-naphthoic acid; and mixtures thereof.

Typical inorganic compositions include cadmium sulfide, cadmium sulfoselenide, zinc oxide, zinc sulfide, sulphur selenium, mercuric sulfide, lead oxide, lead sulfide, cadmium selenide, titanium dioxide, indium trioxide and the like.

In addition to the aforementioned organic materials other organic materials which may be employed in the imaging layer include polyvinylcarbazole; 2,4-bis (4,4'-diethyl-aminophenyl)-1,3,4-oxidiazole; N-isopropylcarbazole; polyvinylanthracene; triphenylpyrrol; 4,5-diphenylimidazolidinone; 4,5-diphenylimidazolidinethione; 4,5-bis-(4'-amino-phenyl)-imidazolidinone; 1,2,5,6-tetraazacyclooctatetraene-(2,4,6,8); 3,4-di-(4'-methoxyphenyl)-7,8-diphenyl-1,2,5,6-tetraazacyclooctatetraene-(2,4,6,8); 3,4-di(4'-phenoxy-phenyl)-7,8-diphenyl-1,2,5,6-tetraaza-cyclooctatetraene-(2,4,6,8); 3,4, 7,8-tetramethoxy-1,2,5,6-tetraaza-cyclooctatetraene-(2,4,6,8)-2-mercapto-benzthiazole; 2-phenyl-4-alpha-naphthylidene-oxazolone; 2-phenyl-4-diphenylidene-oxazolone; 2-phenyl-4-p-methoxy benzylidene-oxazolone; 6-hydroxy-2-phenyl-(p-dimethyl-amino phenyl)-benzofurane; 6-hydroxy-2,3-di-(p-methoxy-phenyl)-benzofurane; 2,3,5,6-tetra-(p-methoxy-phenyl)-furo-(3,2f)-benzofurane; 4,-dimethyl-amino-benzylidene-benzhydrazide; 4-dimethylaminobenzylideneiso-nicotinic acid hydrazide; turfurylidene-(2)-4'-dimethylamino-benzhydrazide; 5-benzylidene-amino-acenaphthene-3-benzylidene-amino-carbazole; (4-N,N-dimethylaminobenzylidene)-p-N,N-dimethyl aminoaniline; (2-nitro-benzylidene)-p-bromo-aniline; N,N-dimethyl-N'(2-nitro-4-cyano-benzylidene)-p-phenylene-diamine; 2,4-diphenyl-quinazoline; 2-(4'-aminophenyl)-4-phenyl-quinazoline; 2-phenyl-4-(4'-di-methyl-aminophenyl)-7-methoxy-quinazoline; 1,3-diphenyl-tetra-hydroimidazole; 1,3-di-(4'-chlorophenyl)-tetra-hydroimidazole; 1,3-diphenyl-24' dimethylaminophenyl)-tetra-hydroimidazole; 1,3-di-(p-tolyl)-2-[quinolyl-(2'-)]-tetra-hydroimidazole; 3-(4'-dimethylaminophenyl)-5-(4''-methoxy-phenyl)-6-phenyl-1,2,4-triazine; 3-; 3-pyridil-(4')-5-(4'dimethylamino-phenyl)-6-phenyl-1,2,4-triazine; 3-(4'-amino-phenyl)-5,6-di-phenyl-1,2,4-triazine; 2,5-bis [4'-amino-phenyl-(1')]-1,3,3-triazole; 2,5-bis-[4'-(N-ethyl-N-acetyl-amino)-phenyl-(1')]-1,3,4-triazole; 1,5-diphenyl-3-methyl-pyrazoline; 1,3,4,5-tetra-phenyl-pyrazoline; 1-phenyl-3-(p-methoxy styrl)-5-(p-methoxy-phenyl)-pyrazoline; 1-methyl-2-(3',4'dihydroxy-methylene-phenyl)-benzimidazole; 2,(4'-dimethylamine phenyl)-benzoxazole; 2-(4'methoxyphenyl)-benzthiazole; 2,5-bis [p-amino-phenyl-(1)]-1,3,4-oxidiazole; 4,5-diphenyl-imidazoline; 3-amino-carbazole; copolymers and mixtures thereof.

Other materials include organic donor-acceptor (Lewis acid-Lewis base) charge-transfer complexes made up of aromatic donor resins such as phenolaldehyde resins, phenoxides, epoxies, polycarbonates, urethanes, styrene or the like complexed with electron acceptors such as 2,4,7-trinitro-9-fluorenone; 2,4,5,7-tetranitro-9-fluorenone; picric acid; 1,3,5-trinitro benzene; chloranil; 2,5-dichloro-benzoquinone; anthraquinone-2-carboxylic acid, 4-nitro-phenol; maleic anhydride; metal halides of the metals and metalloids of groups I-B and II-VIII of the periodic table including for example aluminum chloride, zinc chloride, ferric chloride, magnesium chloride, calcium iodide, strontium bromide, chromic bromide, arsenic triiodide, magnesium bromide, stannous chloride etc.; boron halides, such as boron trifluorides; ketones such as benzophenone and anisil, mineral acids such as sulfuric acid; organic carboxylic acids such as acetic acid and maleic acid, succinic acid, citroconic acid, sulphonic acid, such as 4-toluene sulphonic acid and mixtures thereof. In addition to the charge transfer complexes, it is to be noted that many other of the above materials may be further sensitized by the charge transfer complexing technique and that many of these materials may be dye-sensitized to narrow, broaden or heighten their spectral response curves.

It is also to be understood that the electrically photosensitive particles themselves may consist of any suitable one or more of the aforementioned electrically photosensitive materials, either organic or inorganic, dispersed in, in solid solution in, or copolymerized with, any suitable insulating resin whether or not the resin itself is photosensitive. This particular type of particles may be particularly desirable to facilitate dispersion of the particle, to prevent undesirable reactions between the binder and the photosensitive material or between the photosensitive and the activator and for similar purposes. Typical resins of this type include polyethylene, polypropylene, polyamides, polymethacrylates, polyacrylates, polyvinyl chlorides, polyvinyl acetates, polystyrene, polysiloxanes, chlorinated rubbers, polyacrylonitrile, epoxies, phenolics, hydrocarbon resins and other natural resins such as rosin derivatives as well as mixtures and copolymers thereof.

The x-form phthalocyanine is preferred because of its excellent photosensitivity although any suitable phthalocyanine may be used to prepare the imaging layer of this invention. The phthalocyanine used may be in any suitable crystal form. It may be substituted or unsubstituted both in the ring and straight chain portions. Reference is made to a book entitled "Phthalocyanine Compounds" by F. H. Moser and A. L. Thomas, published by the Reinhold Publishing Company, 1963 edition for a detailed description of phthalocyanines and their synthesis. Any suitable phthalocyanine may be used in the present invention. Phthalocyanines encompassed within this invention may be described as compositions having four isoindole groups linked by four nitrogen atoms in such a manner so as to form a conjugated chain, said compositions have the general formula $(C_8H_4N_2)_4R_n$ wherein R is selected from the group consisting of hydrogen, deuterium, lithium, osdium, potassium, copper, silver, beryllium, magnesium, calcium, zinc, cadmium barium, mercury aluminum, gallium, indium lanthanum, neodymium, samarium, europium, gadolinium, dypsprosium, holmium, erbium, thulium, ytterbium, lutecium, titanium, tin hafnium, lead, silicon, germanium, thorium, vanadium, antimony, chromium, molybdenum, uranium, manganese, iron, cobalt, nickel, rhodium, palladium, osmium, and platinum; and $n$ is value of greater than 0 and equal to or less than 2. Any other suitable phthalocyanines such as ring or aliphatically substituted metallic and/or non-metallic phthalocyanines may also be used if suitable. As above noted, any suitable phthalocyanine may be used to prepare the photoconductive layer of the present invention. Typical phthalocyanines are: aluminum phthalocyanine, aluminum polychlorophthalocyanine, antimony phthalocyanine, barium phthalocyanine, beryllium phthalocyanine, cadmium hexadecachlorophthalocyanine, cadmium phthalocyanine, calcium phthalocyanine, cerium phthalocyanine, chromium phthalocyanine, cobalt phthalocyanine, cobalt chlorophthalocyanine, copper 4-aminophthalocyanine, copper bromochlorophthalocyanine, copper 4-chlorophthalocyanine, copper 4-nitrophthalocyanine, copper phthalocyanine, copper phthalocyanine sulfonate, copper polychloro-phthalocyanine, deuteriophthalocyanine dysprosium phthalocyanine, erbium phthalocyanine, europium phthalocyanine, gadolinium phthalocyanine, gallium phthalocyanine, germanium phthalocyanine, hafnium phthalocyanine, halogen substituted phthalocyanine, holmium phthalocyanine, indium phthalocyanine, iron phthalocyanine, iron polyhalophthalocyanine, lanthanum phthalocyanine, lead phthalocyanine, lead polychlorophthalocyanine cobalt hexaphenylphthalocyanine, copper pentaphenylphthalocyanine, lithium phthalocyanine, lutecium phthalocyanine, magnesium phthalocyanine, manganese phthalocyanine, mercury phthalocyanine, molybdenum phthalocyanine, naphthalocyanine, neodymium phthalocyanine, nickel phthalocyanine, nickel polyhalophthalocyanine, osmium phthalocyanine, palladium phthalocyanium, palladium chlorophthalocyanine, alkoxyphthalocyanine, alkylaminophthalocyanine, alkylmercaptophthalocyanine, aralkylaminophthalocyanine, aryloxyphthalocyanine, arylmercaptophthalocyanine, copper phthalocyanine piperidine, cycloalkylaminophthalocyanine, dialkylaminophthalocyanine, diaralkylaminophthalocyanine, dicyloalkylaminophthalocyanine, hexdecahydrophthalocyanine, imidomethylphthalocyanine, 1,2 naphthalocyanine, 2,3 naphthalocyanine, octaazaphthalocyanine, sulfur phthalocyanine, tetraazaphthalocyanine, tetra-4-acetylaminophthalocyanine, tetra-4-aminobenzoylphthalocyanine, tetra-4-aminophthalocyanine, tetra chloromethylphthalocyanine, tetra-diazophthalocyanine, tetra-4, 4-dimethyloctaazaphthalocyanine, tetra-4, 5-diphenylenedioxide phthalocyanine, tetra-4, 5-diphenyloctaazaphthalocyanine, tetra-(6-methylbenzothiazoyl) phthalocyanine, tetra-p-methylphenylaminophthalocyanine, tetramethylphthalocyanine, tetra-naptho-triazolylphthalocyanine tetra-4-naphthylphthalocyanine, tetra-4-nitrophthalocyanine, tetra-peri-naphthylene-4, 5-actaazaphthalocyanine, tetra-2, 3-phenyleneoxide phthalocyanine, tetra-4-phenyloctaazaphthalocyanine, tetraphenylphthalocyanine, tetraphenylphthalocyanine tetracarboxylic acid, tetraphenylphthalocyanine tetrabarium carboxylate, tetraphenylphthalocyanine tetra-calcium carboxylate, tetrapyridyphthalocyanine, tetra-4-trifluoromethyl-mercapto-phthalocyanine, tetra-4-trifluoromethylphthalocyanine, 4,5-thionaphthene, octaazaphthalocyanine, platinum phthalocyanine, potassium phthalocyanine, thodium phthalocyanine, samarium phthalocyanine, silver phthalocyanine, silicone phthalocyanine, sodium phthalocyanine, sulfonated phthalocyanine thorium phthalocyanine, thulium phthalocyanine, tin chlorophthalocyanine, tin phthalocyanine, titanium phthalocyanine, uranium phthaocyanine, vanadium phthalocyanine, zinc phthalocyanine, others described in the Moser text and mixtures, dimers, trimers, oligomers, polymers, copolymers or mixtures thereof.

Although the basic physical property desired in the imaging layer employed in the prior art manifold imaging process is that it be frangible as prepared or after having been suitably activated such property is not required in the present process to produce a latent image that is, the imaging layer employed in the process of this invention to produce a latent image need not be sufficiently weak structurally so that the application of an electrical field combined with the action of electromagnetic radiation will fracture the imaging layer. However, the imaging layer employed in the process of this invention must be frangible as prepared or after having been suitably activated in order to develop the latent image by placing the imaging layer in a manifold sandwich, subjecting the manifold sandwich to an electrical field and separating the sandwich while under the electrical field. Thus, in the process of this invention a latent image may be formed in an imaging layer which is not frangible or cohesively weak but the latent image may be subsequently developed by suitably activating the imaging layer thereby sufficiently weakening the structure of the imaging layer so that the application of the second electrical field combined with the action of the electromagnetic radiation to which the imaging layer has previously been exposed will fracture the imaging layer. Further, at the time the manifold sandwich is separated while under the second electrical field, the imaging layer must be cohesively weak so as to fracture upon the application of an electrical field the strength of which is below that field strength which will cause electrical breakdwon or arcing across the imaging layer. Hence, another term for "cohesively weak," therefore, is "field fracturable."

While, as stated above, it is not necessary to employ cohesively weak imaging layers in the process of this invention to produce a latent image such cohesively weak imaging layers may be employed. Exposure of the cohesively weak imaging layers may take place either within or without of a manifold sandwich. Providing the electrical field is removed prior to sandwich separation a latent image is produced in the cohesively weak imaging layer.

The imaging layer serves as the photoresponsive element of the system as well as the colorant for the final image produced. Preferably, the imaging layer is selected so as to have a high level of response while at the same time being intensely colored so that a high contrast image can be formed by the high gamma system of this invention. The imaging layer may be homogeneous comprising, for example, a solid solution of two or more pigments. The imaging layer may also be heterogeneous comprising, for example, pigment dispersed in a binder.

One technique for achieving low cohesive strength in the imaging layer is to employ relatively weak, low molecular weight materials therein. Thus, for example, in a single component homogeneous imaging layer, a monomeric compound or a low molecular weight polymer complexed with a Lewis acid to impart a high level of photoresponse to the layer may be employed. Similarly, when a homogeneous layer utilizing two or more components in solid solution is selected to make up the imaging layer, either one or both of the components of the solid solution may be a low molecular weight material so that the layer has the desired low level of cohesive strength. This approach may also be taken in connection with the heterogeneous imaging layer. Although the binder material in the heterogeneous system may in itself be photosensitive it does not necessarily have this property. Materials may be selected for use as this binder material solely on the basis of physical properties without regard to their photosensitivity. This is also true of the two component homogeneous system where photoinsensitive materials with the desired physical properties can be used. Any other technique for achieving low cohesive strength in the imaging layer may also be employed. For example, suitable blends of incompatible materials such as a blend of a polysiloxane resin with a polyacrylic ester resin may be used either as the binder layer in a heterogeneous system or in conjunction with a "homogeneous" system in which the photoresponsive material may be either one of the incompatible components (complexed with a Lewis acid) or a separate and additional component of the layer. The thickness of the imaging layer preferably ranges from about 0.2 microns to about 10 microns generally about 0.5 microns to about 5 microns and preferably about 1 micron.

The ratio of photosensitive pigment to binder by weight in the heterogeneous system may range from about 10 to 1 to about 1 to 10 respectively, but it has generally been found that properties in the range of from about 1 to 4 to about 2 to 1 respectively produce the best results and, accordingly, this constitutes a preferred range.

The binder material in the heterogeneous imaging layer or the material used in conjunction with the pigment material in the homogeneous layer, where applicable, may comprise any suitable cohesively weak material or materials which can be rendered cohesively weak. Typical materials include: microcrystalline waxes such as: Sunoco 1290, Sunoco 5825, Sunoco 985, all available from Sun Oil Co.; Paraflint RG, available from the Moore and Munger Company; paraffin waxes such as: Sunoco 5512, Sunoco 3425, available from Sun Oil Co.; Sohio Parowax, available from Standard Oil of Ohio; waxes made from hydrogenated oils such as: Capitol City 1380 wax, available from Capitol City Products, Co., Columbus, Ohio; Caster Wax L-2790, available from Baker Caster Oil Co.; Vitikote L-304, available from Duro Commodities; polyethylenes such as: Eastman Epolene N-11, Eastman Epolene C-12, available from Eastman Chemical Products, Co., Polyethylene DYJT, Polyethylene DYLT, Polyethylene DYNF, Polyethylene DYDT, all available from Union Carbide, Corp.; Marlex TR 822, Marlex 1478, available from Phillips Petroleum Co.; Epolene C-13, Epolene C-10, available from Eastman Chemical Products, Co.; Polyethylene AC8, Polyethylene AC612, Polyethylene AC324, available from Allied Chemicals; modified styrenes such as: Piccotex 75, Piccotex 100, Piccotex 120 available from Pennsylvania Industrial Chemical; Vinylacetate-ethylene copolymers such as: Elvax Resin 210, Elvax Resin 310, Elvax Resin 420, available from E. I. DuPont de Nemours & Co., Inc., Vistanex MH, Vistanex L-80, available from Enjay Chemical Co.; vinyl chloride-vinyl acetate copolymers such as: Vinylite VYLF, available from Union Carbide Corp.; styrene-vinyl toluene copolymers; polypropylenes; and mixtures thereof. The use of an insulating binder is preferred because it allows the use of a larger range of electrically photosensitive pigments.

A mixture of microcrystalline wax and polyethylene is preferred because it is cohesively weak and an insulator.

When the imaging layer is not sufficiently cohesively weak to allow imagewise fracture during the development of the latent image, it is desirable to include an activation step in the process of this invention. The activation step may take many forms such as applying heat to the imaging layer thus reducing its cohesive strength or applying a substance to the surface of the imaging layer or including a substance in the imaging layer which substance lowers the cohesive strength of layer or aids in lowering the cohesive strength. The substance so employed is termed an "activator." Preferably, the activator should have a high resistivity so as to prevent electrical breakdwon of the manifold sandwich. Accordingly, it will generally be found to be desirable to purify commercial grades of activators so as to remove impurities which might impart a higher level of conductivity. This may be accomplished by running the fluids through a clay column or by employing any other suitable purification technique. Generally speaking, the activator may consist of any suitable material having the aforementioned properties. For purposes of this specification and the appended claims, the term activator shall be understood to include not only materials which are conventionally termed solvents but also those which are partial solvents, swelling agents or softening agents for the imaging layer.

It is generally preferable that the activator have a relatively low boiling point so that fixing of the resulting image can be accomplished upon evaporation of the activator. If desired, fixing of the image can be accomplished more quickly with mild heating at most. It is to be understood, however, that the invention is not limited to the use of these relatively volatile activators. In fact, very high boiling point non-volatile activators including silicone oils such as dimethyl-polysiloxanes and very high boiling point long chain aliphatic hydrocarbon oils ordinarily used as transformer oils such as Wemco-C transformer oil, available from Westinghouse Electric Co., have also been successfully utilized in the imaging process. Although these less volatile activators do not dry off by evaporation, image fixing can be accomplished by contacting the final image with an absorbent sheet such as paper which absorbs the activator fluid. In short, any suitable volatile or non-volatile activator may be employed. Typical activators include Sohio Odorless Solvent 3440, an aliphatic (kerosene) hydrocarbon fraction, available from Standard Oil Co. of Ohio, carbon tetrachloride petroleum ether, Freon 214 (tetrafluorotetrachloropropane), other halogenated hydrocarbons such as perchloroethylene, trichloromonofluoromethane, tetrachlorodifluoroethane, trichlorotrifluoroethane, ethers such as diethyl ether, diisopropyl ether, dioxane, tetrahydrofuran, ethyleneglycol monoethyl ether, aromatic and aliphatic hydrocarbons such as benzene, toluene, xylene, hexane, cyclohexane, gasoline, mineral spirits and white mineral oil, and vegetable oils such as coconut oil, babussu oil, palm oil, olive oil, castor oil, peanut oil, and neatsfoot oil, decane, dodecane, and mixtures thereof. Sohio Odorless Solvent 3440 is preferred because it is odorless, non-toxic and has a relatively high flash point.

Although the imaging layers may be prepared as self supporting films, normally these layers are coated onto a sheet referred to above as the donor sheet or substrate. For convenience the combination of imaging layer and donor sheet is referred to as the donor. When employing a binder the pigment can be mixed in the binder material by conventional means for blending solids as by ball milling. After blending the ingredients of the imaging layer the desired amount is coated on a substrate. In a particularly preferred form of the invention an imaging layer comprising the electrically photosensitive pigment dispersed in a binder is coated onto an electrically insulating donor sheet.

The donor sheet and receiver sheet may comprise any suitable electrically insulating or electrically conducting material. Insulating materials are preferred since they allow the use of high strength polymeric materials. Typical insulating materials include polyethylene, polypropylene, polyethylene terephthalate, cellulose acetate, paper, plastic coated paper, such as polyethylene coated paper, vinyl chloride -vinylidene chloride copolymers and mixtures thereof. Mylar ( a polyester formed by the condensation reaction between ethylene glycol and terephalic acid available from E. I. DuPont de Nemours & Co., Inc.) is preferred because of its durability and excellent insulative properties. Not only does the use of this type of high strength polymer provide a strong substrate for the positive and negative images formed on the donor substrate and receiver sheet but, in addition, it provides an electrical barrier between the electrodes and the imaging layer which tends to inhibit electrical breakdwon of the system while subjecting the manifold sandwich to an electrical field. The donor sheet and receiver sheet may each be selected from different materials. Thus a manifold sandwich can be prepared by employing an insulating donor sheet while a conductive material is employed as a receiver sheet.

As stated above, according to the process of this invention, the imaging layer and subsequently the manifold sandwich comprising the donor sheet, receiver sheet and the imaging layer is subjected to an electrical field. The electrical field can be applied in many ways. Generally the sandwich is placed between electrodes having different electrical potential. Also, an electrical charge can be imposed upon one or both of the donor sheet and receiver sheet before or after forming the sandwich by any one of several known methods for inducing a static electrical charge into a material. Static charges can be imposed by contacting the sheet or substrate with an electrically charged electrode. Alternatively one or both sheets may be charged using corona discharge devices such as those described in U.S. Pat. No. 2,588,699 to Carlson, U.S. Pat. No. 2,777,957 to Walkup, U.S. Pat. No. 2,885,556 to Gundlach or by using conductive rollers as described in U.S. Pat. No. 2,980,834 to Tregay et al., or by frictional means as described in U.S. Pat. No. 2,297,691 Carlson or other suitable apparatus.

Thus the electrical field can be provided by means known to the art for subjecting an area to an electrical field. The electrodes employed may comprise any suitable conductive material and may be flexible or rigid. Typical conductive materials include: metals such as aluminum, brass, steel, copper, nickel, zinc, etc., metallic coatings on plastic substrates, rubber rendered conductive by the inclusion of a suitable material therein, or paper rendered conductive by the inclusion of a suitable material therein or through conditioning in a humid atmosphere to insure the presence therein of sufficient water content to render the material conductive. Conductive rubber is preferred because of its flexibility. In the process of this invention wherein the imaging layer is exposed to activating electromagnetic radiation while positioned between electrodes one of the electrodes must be at least partially transparent. The transparent conductive electrode may be made of any suitable conductive transparent material and may be flexible or rigid. Typical conductive transparent materials include cellophane, conductively coated glass, such as tin or indium oxide coated glass, aluminum coated glass, or similar coatings on plastic substrates. NESA, a tin oxide coated glass available from Pittsburgh Plate Glass Co., is preferred because it is a good conductor and is highly transparent. In the process of this invention wherein the donor or receiver is composed of conductive material each may also be employed as the electrodes by which the imaging layer is subjected to an electrical field. That is either one or both of the donor sheet and receiver sheet may serve a dual function in the process of this invention.

In the preferred embodiment of this invention the imaging layer is coated onto an electrically insulated donor sheet which sheet can sustain a static electrical charge. Usually such a donor is charged by means of a corona discharge device or a roller electrode with an applied voltage of from about 5KV to about 15KV although higher voltage can be employed. If the latent image is to be formed while the imaging layer is sandwiched between the donor sheet and the receiver sheet the strength of the electrical field applied across the sandwich depends on the structure of the manifold sandwich and the materials used. For example, if highly insulating receiver and donor substrate materials are used a much higher field may be applied then if relatively conductive donor and receiver sheets are used. The field strength required may, however, be easily determined. If too large a potential is applied, electrical breakdown of the manifold sandwich will occur allowing arcing between the electrodes. If too little potential is applied, the imaging layer will not fracture in imagewise configuration. By way of example, if a 3 mil Mylar receiver sheet and a 2 mil Mylar donor sheet are used, potentials as high as 20,000 volts may be applied between the electrodes. In the case of producing a latent image in an imaging layer which is not sandwiched between a donor and receiver sheet, potentials in the range of from 1 to 12 KV are preferred. The preferred field strength across the manifold sandwich are in the range of from 1,000 volts/mil to about 7,000 volts/mil of electrically insulating material. Since relatively high potentials are utilized, it is desirable to insert a resistor in the circuit to limit the flow of current resistors on the order of from about 1 megohm to about 20,000 megohms are conventionally used.

The electrical field employed to develop the latent image can be the same or less than the voltage employed to form the latent image. Normally about the same voltage is employed in the development of the latent image as was employed to form the latent image. Higher voltages in the development of the latent image can be employed however such higher voltages are not preferred.

Whether the positive image is formed on the donor sheet or the receiver sheet depends on the imaging layer materials used and the polarity of the applied field. It has been found in general however that if the donor side electrode is held at a positive potential with respect to the receiver side electrode, that the positive image is formed on the donor sheet and a negative image is formed on the receiving sheet. That is the illuminated portions of the imaging layer adhere to the receiver sheet and the non-illuminated areas of the imaging layer adhere to the donor sheet.

It has also been found in general that when the imaging layer is coated onto a donor sheet, the best quality images are produced by exposing through the donor sheet.

The electrically photosensitive material is chosen so as to be responsive to the wavelength of the electromagnetic radiation used. It is to be noted that different electrically photosensitive materials have different spectral responses and that the spectral response of many electrically photosensitive materials may be modified by dye-sensitization so as to either increase or narrow the spectral response of the material to a peak or to broaden it to make it more panchromatic in its response. Thus electromagnetic radiation such as visible light, ultraviolet light, or any other suitable source of electromagnetic radiation may be used to expose the imaging layer of this invention.

BRIEF DESCRIPTION OF THE DRAWINGS

The advantages of this invention will become apparent upon consideration of the detailed disclosure of the invention especially when taken in conjunction with the accompanying drawings wherein:

Referring now to FIG. 1, imaging layer 2 comprising electrically photosensitive material 4 dispersed in binder 3 is deposited on the surface of donor sheet 5. Receiver sheet 6 rests upon imaging layer 2 to complete the manifold sandwich.

Referring now to FIG. 2, there is shown a process capable of producing a latent image on transparent or opaque receiver sheets or on transparent or opaque donor sheets. In FIG. 2, imaging layer 201 containing an electrically photosensitive material is sandwiched between donor sheet 203 and receiver sheet 205. An electrical field is applied across the manifold sandwich as it passes through electrodes 207 and 209 which are connected to potential source 211 and resistor 213. Although FIG. 2 shows a manifold sandwich not coming in contact with either of electrodes 207 and 209 they may contact one or both electrodes when the electrical field is applied. Preferably the sandwich will contact at least one electrode to serve as a guide and be spaced 5 to 8 mils from the other electrode to prevent binding. The manifold sandwich is supported by transparent plate 215. The electrically photosensitive material is exposed to light image 217 through transparent plate 215 and transparent donor sheet 203. In those instances wherein donor sheet 203 is desirably opaque to the electromagnetic radiation employed, imaging layer 201 can be exposed to light image 217*a*. When light image 217 *a* is employed receiver sheet 205 is at least partially transparent to the electromagnetic radiation employed or is not present during the exposure step of the process of this invention. After exposure, the electrical field imposed across the manifold sandwich by electrodes 207 and 209 is removed by grounding the circuit by grounding switch 219. The manifold sandwich can be separated after grounding and the donor stored for an extended period of time in the dark or even exposed to normal room light.

Turning now to FIG. 3 there is diagramatically displayed the development of the latent image produced in accordance with the process of this invention by means of a manifold layer transfer imaging process. The optional activation step is shown in FIG. 3. Although the activator may be applied by any suitable technique such as with a brush, with a smooth or rough surface roller, by flow coating, by vapor condensation or the like, FIG. 3 shows the activator fluid 301 being sprayed onto imaging layer 303 from container 305. Following the deposition of the activator fluid, receiver sheet 307 is brought into contact with imaging layer 303 and the sandwich is closed by rollers 309 which also serve to squeeze out any excess activator fluid which may have been deposited. In certain instances, the activation step may be omitted thus, for example, a manifold sandwich may be supplied wherein imaging layer 303 is initially fabricated to have a low cohesive strength so that activation may be omitted and receiver 307 may be placed on the surface of imaging layer 303 directly. It is generally preferable, however, to include an activation step in the process for most imaging layers. After receiver sheet 307 has been placed on imaging layer 303 an electrical field is applied across the manifold sandwich through electrodes 311 and 313 as in FIG. 2. It is preferred that the manifold sandwich come in contact with either or both of the electrodes when the electrical field is applied. Also, as before by contacting at least one electrode the sandwich is guided and the electrodes should be spaced from 5 to 8 mils from each other to prevent binding. Electrodes 311 and 313 are connected to potential source 315 and resistor 317.

Figure 2:
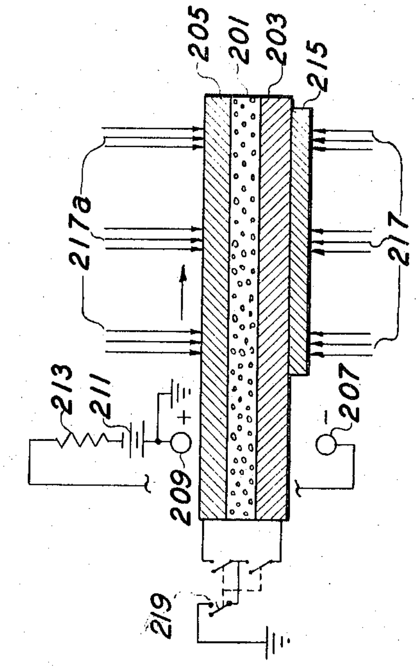
FIG. 2 is a side sectional view diagramatically illustrating the exposure step of this invention.
Figure 1:
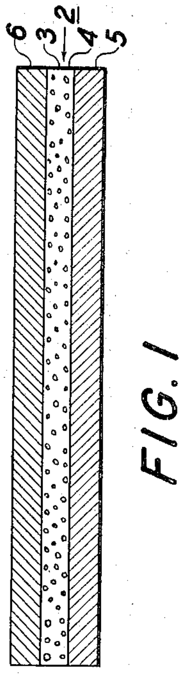
FIG. 1 is a side sectional view of a manifold sandwich for use in the process of this invention.
Figure 3:
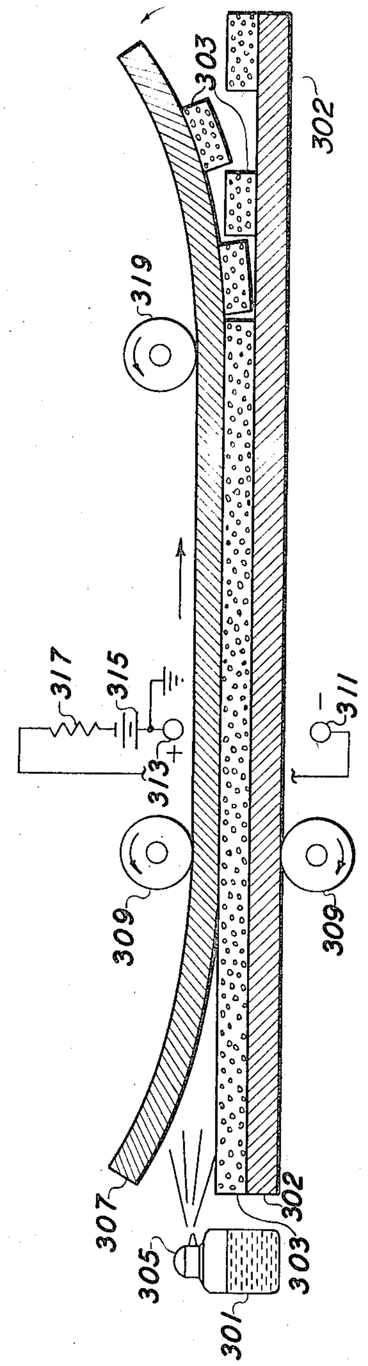
FIG. 3 is a side sectional view diagramatically illustrating the development of the latent image produced by the process of this invention.

Alternatively, the charging electrode may be a corona discharge device or rollers 309 may be conductive for example and be used in place of electrodes 311 and 313. Additionally, the electrodes may consist of a sharp edge or a friction charging device such as a fur covered roller. The manifold sandwich, after passing electrodes 311 and 313 then passes roller 319 which acts as a guide for the manifold sandwich and as a bearing point for the stripping apart of the sandwich. Alternatively, roller 319 may be a sharp edge, a rod, or a wire. Upon separation of the manifold sandwich, imaging layer 303 fractures along the edges of exposed areas and leaves the surface of the donor sheet 302 which was exposed to electromagnetic radiation. Accordingly, once separation is complete, exposed portions of imaging layer 303 are retained on one of sheets 302 and 307 while unexposed portions are retained on the other sheet. The portions thus provide a positive image on one sheet and a negative image on the other sheet. Various fixative procedures can be employed on the image to be preserved after separation of the sandwich.

DESCRIPTION OF PREFERRED EMBODIMENTS

The following examples further specifically illustrate the present invention. The examples below are intended to illustrate various preferred embodiments of the improved method of producing a latent image. The parts and percentages are by weight unless otherwise indicated.

EXAMPLE I – IV

An electrically photosensitive imaging layer is prepared from three different materials as follows: a commercial metal-free phthalocyanine is first purified by O-dichlorobenzene extraction to remove organic impurities. Since this extraction step yields the less sensitive beta crystalline form, the desired "*x*" form is obtained by dissolving about 100 grams of beta phthalocyanine in approximately 600 cc. of sulphuric acid precipitating it by pouring the solution into about 3,000 cc. of ice water and washing with water to neutrality. The thus purified alpha phthalocyanine is then salt milled for 6 days and desalted by slurrying in distilled water, vacuum filtering, water washing, and finally methanol washing until the initial filtrate is clear. After vacuum drying to remove residual methanol the "*x*" form phthalocyanine thus produced is used to prepare the imaging layer of the following example. A sample of Irgazine Red 2 BLT available from Geigy Chemical Co. is purified by solvent extraction and a sample of Algol Yellow GC a concentrated powder available from General Aniline and Film Corporation is purified by recrystallization from sulfuric acid. About 2.5 parts of the purified x-phthalocyanine, 1.2 parts of the purified Algol Yellow, 2.8 parts of the purified Irgazine Red and about 45 parts of naphtha are combined and placed in a ball mill and milled for a period of 4 hours.

A binder material is prepared by combining about 3 parts of Bakelite polyethylene DYDT available from Union Carbide Corporation, about 1.5 parts of Paraflint RG micro-crystalline wax, available from Moore and Munger, about 15 parts of a vinyl acetate-ethylene copolymer available from E. I. DuPont de Nemours and Co. Inc., as Elvax 420, about 2.5 parts of a modified styrene available from Pennsylvania Industrial Chemical Company as Piccotex 75 and about 0.1 part of polyethylene available from Union Carbide Corporation as polyethylene DYDT in in about 20 parts of Sohio Odorless Solvent 3440 a kerosene fraction available from the Standard Oil Company. The mixture is heated with stirring until all the solid materials are dissolved. Preferably, prior to combining the materials they are purified by dissolving them individually in an organic solvent precipitating them and washing with a low molecular weight organic alcohol. The above described mixture when in clear solution is cooled to form a paste which is then mixed with the milled photosensitive materials. The photosensitive imaging materials combined with the binder paste is milled in a ball mill for 16 hours, heated to 65° and held at that temperature for 2 hours. After cooling the resulting paste is coated on a 3 mil Mylar sheet with a knife set at a gap of 4.4 mil to obtain a coating thickness of approximately 1.4 mil after drying. The coated Mylar is then placed upon the tin oxide surface of a NESA glass plate with the uncoated surface of the Mylar facing the tin oxide. The layer containing the photosensitive material is activated by applying Freon 214 by means of a stroke of a brush saturated with the Freon. A receiver sheet of 2 mil thick Mylar is placed over the activated imaging layer and the excess activator removed by applying light pressure on the receiver sheet. The negative terminal of a 10,000 volt (10KV) DC power supply is then connected to the NESA glass in series with a 5,500 megohm resistor and a positive terminal is connected to a sheet of black electrically conductive paper which is placed over the receiver and is grounded. With the voltage applied a pattern of white incandescent light image is projected upward through the NESA glass through a lens having a setting of f-22 for one second providing an illumination of approximately 0.2 ft/candle seconds. After exposure, the terminals are disconnected from the power supply and the charge across the sandwich leaked to ground. When a volt meter indicates no potential between the donor and receiver, the sheets are separated with the imaging layer remaining intact and coated on the donor sheet. The donor sheet was cut into sections which were left exposed to room light for periods of time. For Example I 30 seconds; Example II 1 minute, Example III 5 minutes; and Example IV 1 hour. The sections were combined with receiver sections to form a sandwich which was placed between the NESA glass and the black paper electrode and in the absence of light a potential of 10KV is applied across the sandwich. Upon separation of the sandwich with the potential source still connected a pair of excellent quality black colored images is observed with a duplicate of the original on the donor sheet and a reversal or negative of the original image on the receiver sheet. Such images are obtained from all four sections of the donor sheet.

EXAMPLE V

The procedure of Example IV is repeated except that the binder material was mixed with about one-third its weight with x-phthalocyanine only. Upon separation of the sandwich a blue colored image is obtained on the donor sheet and a blue colored negative image is obtained on the receiver sheet.

EXAMPLE VI

The procedure of Example II is repeated except that the activator is applied after exposure which took place for 2 seconds at a lens setting of f-11. The imaging layer is activated by the application of Sohio Odorless Solvent 3440 and recombined in a manifold sandwich after 1 minute at room light exposure. In the absence of light a field of 10KV is applied across the sandwich and with the potential still connected, the sandwich is separated yielding a pair of excellent quality images with a duplicate of the original image on the donor sheet and a negative of the original image on the receiver sheet.

EXAMPLE VII

A donor sheet is prepared by coating the pigment-binder mixture of Example I onto a sheet of 3 mil Mylar using a No. 20 draw wire wound draw down rod leaving a coating of about 0.31 grams/sq.ft. on the Mylar. After activating the imaging layer by applying Sohio Odorless Solvent 3440, a sheet of polystyrene is laid over the imaging layer as a receiver and the manifold sandwich is placed between electrodes which are connected to a potential of 11 KV. The imaging layer is exposed to a pattern of white incandescent light through the NESA electrode with a lens setting of f-11 for one second yielding an illumination of approximately 0.8 ft. candle seconds. The field is reduced to approximately 0 and the sandwich separated. The donor is placed in darkness for a period of over 21 hours. A new sandwich is formed employing a sheet of polystyrene as a receiver and the imaging layer is re-activated by the application of Sohio Odorless Solvent 3440. Under subdued light, the sandwich is subjected to a field of 11 KV and separated under that potential. A pair of excellent images are produced upon separation of the sandwich with a duplicate of the original on the donor sheet and a reversal or negative of the original image on the receiver sheet.

EXAMPLE VIII

The procedure of Example VII is repeated with the exception that the second electrical field is at a potential of only 5 KV. Upon separation of the sandwich under potential a pair of excellent quality images are obtained with a duplicate of the original image on the donor sheet and a negative of the original image on the receiver sheet.

EXAMPLE IX

A donor sheet containing an imaging layer is prepared as described in Example I and is subjected to an electrical field of about 11 KV. With the potential connected, the imaging layer is exposed on its side opposite the Mylar to a pattern of white incandescent light for a period of one second through a lens having a setting of f-22 providing an illumination of about 0.2 ft. candle seconds. The potential is then removed from the imaging layer and the imaging layer is stored in the dark for a period of 24 hours. The imaging layer is then activated with Sohio Odorless Solvent 3440 applied with the stroke of a brush and a polystyrene sheet placed over the activated imaging layer as a receiver. The sandwich is then subjected to an electrical field of about 11 KV and is separated with potential still connected. An excellent pair of images is thus produced with a duplicate of the original image on the donor sheet and a negative of the original image on the receiver sheet.

Although specific components and proportions have been stated in the above description in the preferred embodiments of the invention other typical materials may be used with similar results. In addition, other materials may be added to the various components of the process to synergize, enhance or otherwise modify the properties of the imaging layer or other components. For example, various dyes, spectral sensitizers, activators, or electrical sensitizers such as Lewis acid may be added to the several components of the manifold sandwich.

Other modifications and ramifications of the present invention will occur to those skilled in the art upon a reading of the present disclosure. These are intended to be included within the scope of this invention.

What is claimed is:

1. An imaging process which comprises subjecting an electrically photosensitive imaging layer comprising electrically photosensitive phthalocyanine particles dispersed in an electrically insulating binder material residing on an electrically insulating donor sheet to a first electrical field, exposing said layer to electromagnetic radiation to which the imaging layer is sensitive while under said electrical field, removing said electrical field from said layer subsequent to said exposure, rendering said layer structurally fracturable in response to the combined effects of said exposure and an electrical field by applying thereto an activating amount of an activator, subjecting the activated imaging layer to a second electrical field while said imaging layer is sandwiched between said donor sheet and a receiver sheet and separating the sandwich while under the second electrical field whereby the imaging layer fractures in imagewise configuration.

2. The method of claim 1 wherein the first electrical field is greater than the second electrical field.

3. The process of claim 1 wherein the activator is selected from the group consisting of solvent, partial solvents, swelling agents and softening agents for said imaging layer.

4. The process of claim 1 wherein the first and second electric fields are in the range of from about 1,000 volts per mil to about 7,000 volts per mil of electrically insulating materials.

5. The method of claim 1 wherein said exposure is made from the side of said imaging layer opposite that adjacent said donor sheet.

6. The process of claim 1 wherein said donor sheet is transparent to electromagnetic radiation to which the imaging layer is sensitive and the imaging layer is exposed through said donor sheet.

7. The process of claim 1 wherein said imaging layer is sandwiched between a receiver sheet and said donor sheet, said donor sheet being transparent to electromagnetic radiation to which said imaging layer is sensitive and the exposure of the imaging layer is made through said transparent donor sheet.

8. An imaging process which comprises subjecting an electrically photosensitive imaging layer comprising electrically photosensitive phthalocyanine particles dispersed in an electrically insulating binder material residing on an electrically insulating donor sheet to a first electrical field, said imaging layer being structurally fracturable in response to the combined effects of exposure to electromagnetic radiation to which said imaging layer is sensitive and an electrical field, exposing said layer to electromagnetic radiation to which said layer is sensitive while under said electrical field, removing said electrical field subsequent to said exposure, subjecting said imaging layer to a second electrical field while said imaging layer is sandwiched between said donor sheet and a receiver sheet and separating the sandwich while under said second electrical field whereby said imaging layer fractures in imagewise configuration providing a negative image of the original on one of the donor and receiver sheets and a positive image on the other of said sheets.

9. The process of claim 8 wherein the first electrical field is greater than the second electrical field.

10. The process of claim 8 wherein said electrical fields are in the range of from about 1,000 volts per mil to about 7,000 volts per mil of electrically insulating material.

* * * * *